United States Patent [19]
Collins

[11] Patent Number: 5,997,099
[45] Date of Patent: Dec. 7, 1999

[54] HOPPER

[76] Inventor: P. Michael Collins, 3790 Sagebrush La., Cincinnati, Ohio 45251

[21] Appl. No.: 08/963,445

[22] Filed: Nov. 3, 1997

Related U.S. Application Data

[60] Provisional application No. 60/029,933, Nov. 4, 1996.

[51] Int. Cl.⁶ .................................................. B60P 1/56
[52] U.S. Cl. ................. 298/29; 298/30; 298/33; 298/38; 298/23 A
[58] Field of Search ................. 298/25, 29, 30, 298/33, 38, 23 A; 105/253, 255; 222/556

[56] References Cited

U.S. PATENT DOCUMENTS

| | | |
|---|---|---|
| 185,055 | 12/1876 | Willes . |
| 407,553 | 7/1889 | Stuebner . |
| 906,117 | 12/1908 | Drewhorst . |
| 940,811 | 11/1909 | Herks . |
| 1,218,920 | 3/1917 | Averill . |
| 1,272,515 | 7/1918 | Peck . |
| 1,417,709 | 5/1922 | Yelm .......................................... 298/30 |
| 2,005,823 | 6/1935 | Ditchfield . |
| 2,126,950 | 8/1938 | Ditchfield . |
| 2,239,671 | 4/1941 | Dempster . |
| 2,289,024 | 7/1942 | Lambert . |
| 2,550,856 | 5/1951 | Ouellet et al. . |
| 2,602,000 | 7/1952 | Richardson . |
| 2,626,828 | 1/1953 | Morgan . |
| 2,663,231 | 12/1953 | Wood .......................................... 298/30 |
| 2,697,002 | 12/1954 | Johansson . |
| 2,800,363 | 7/1957 | Cilpatrick, Sr. . |
| 2,824,762 | 2/1958 | Kaiser . |
| 2,860,791 | 11/1958 | Kaiser . |
| 2,888,885 | 6/1959 | Dorey . |
| 2,891,487 | 6/1959 | Hankins . |
| 2,901,288 | 8/1959 | Gilpatrick . |
| 3,128,891 | 4/1964 | Schwengel . |
| 3,474,920 | 10/1969 | Miller . |
| 3,797,878 | 3/1974 | Fagre et al. . |
| 3,946,909 | 3/1976 | Wheeler . |
| 4,032,192 | 6/1977 | Jensen .......................................... 298/23 A |
| 4,138,948 | 2/1979 | Korolis . |
| 4,199,054 | 4/1980 | Wirsbinski . |
| 4,343,511 | 8/1982 | Rowan et al. . |
| 4,354,831 | 10/1982 | Shinkawa et al. . |
| 5,575,536 | 11/1996 | Wallan .......................................... 298/23 A X |

FOREIGN PATENT DOCUMENTS

| | | | |
|---|---|---|---|
| 585395 | 2/1925 | France .......................................... | 222/556 |

*Primary Examiner*—Stephen T. Gordon
*Attorney, Agent, or Firm*—Wood, Herron & Evans, L.L.P.

[57] ABSTRACT

A hopper (10, 120) for use with flowable material (12) such as particulate, aggregate, sand, salt, gravel, top soil or the like includes at least one pivotal gate (14) attached to a frame (18) of the hopper (10, 120). Advantageously, the gate (14) swings toward an open position in response to the weight of the material (12) in the hopper (10, 120) to allow the material (12) to flow out of the hopper (10, 120). Additionally, the gate (14) automatically returns toward the closed position by gravity due to the position of the pivot axis of the hinge (16) connecting the gate (14) to the frame (18) relative to the center of gravity of the gate (14). Furthermore, a latch (58) and other features of the hopper (10, 120) control the movement of the gate (14) to regulate the flow of the material (12) from the hopper (10, 120).

21 Claims, 7 Drawing Sheets

HOPPER

This is a continuation-in-part of U.S. Provisional Patent Application Ser. No. 60/029,933, filed Nov. 4, 1996, which is hereby incorporated by reference.

BACKGROUND OF THE INVENTION

This invention relates to a hopper, and more particularly, to a hopper for holding and discharging flowable material.

Hoppers, buckets and other receptacles or devices are typically used in the construction industry. One type of commonly known hopper has a large open top and tapered or funnel-shaped sidewalls. A sliding or translating hatch or door is located at the bottom of such a hopper. The hopper is filled through the open top typically with sand, gravel, road salt or other granular or particulate material. The filled hopper is then transported to a job site where it will be emptied. The intended mode of emptying such a hopper is to open the hatch or door and allow the granular material to flow out of the hopper by gravity.

However, one common drawback to hoppers of this type is that during transit, the granular contents shift and settle in the hopper so that the contents become packed or jammed therein. As a result, once the hatch or door is manually opened, the material does not flow out of the hopper. Commonly, the worker uses a shovel handle or similar tool inserted into the open top of the hopper or upwardly through the open door to dislodge the packed contents. This is an inconvenient and potentially dangerous practice because the worker may injure himself while attempting to dislodge the material or be unable to escape the flow of the material out of the hopper once it is dislodged.

Alternatively, workers commonly tip the hopper and pour the contents out of the open top. This practice, for which the hopper was not designed, is also inconvenient and potentially dangerous because the mass of the filled hopper may be difficult to safely control and maneuver.

Moreover, even after the filled hopper is transported to the job site and the contents are dislodged from the hopper, hoppers of this type have no mechanism for regulating the flow of the contents out of the hopper. In many instances, only a portion of the contents needs to be discharged from the hopper at a particular location or job site. However, regulating the flow of the contents out of known hoppers of this type is very difficult, if possible at all.

Additionally, the mere transportation of the filled hopper to the job site or other location typically requires substantial equipment such as a construction crane and flat bed truck or the like. In many instances, such equipment is not available or it is impractical for use in transporting the material, particularly, if an individual, home owner or do-it-yourself worker is in need of a bulk load of material.

SUMMARY OF THE INVENTION

A primary objective of this invention has been to provide an improved hopper which overcomes the short comings and disadvantages of known hopper designs.

Another objective of this invention has been to provide an improved hopper that can be easily and safely loaded and emptied by an operator.

A further objective of this invention has been to provide such a hopper which has the capability of regulating the discharge or flow of the material from the hopper.

A still further objective of this invention has been to provide such a hopper that does not require heavy, industrial or construction machinery for transportation and use.

These and other objectives of the invention have been attained by a new hopper design which, in a presently preferred embodiment, includes a hinge and gate configuration which allows for the gravity discharge of the material from the hopper. The hopper is open at the top end for filling. The hopper includes one or more gates which are suspended from an upper frame portion of the hopper and hang downwardly from a hinge. Each gate has a generally vertical panel and a downwardly sloped bottom panel. In one presently preferred embodiment the hopper includes a pair of opposed spaced gates. The hinge for each gate is located at an upper edge and is spaced from a center of gravity of the gate thereby creating a moment arm about the hinge which biases the gate toward a closed position. The gate is secured in the closed position by a latch.

When the hopper is filled and the latch is released, the gates open automatically as a result of the weight of the material in the hopper forcing the gates toward an open position. The gates open as a result of gravity by the downward force of the contents of the hopper on the gates thereby urging the bottom edges of the gates apart and allowing the material to flow by gravity from the hopper. When the weight of the contents of the hopper approaches the force created by the moment arm of each gate about the hinge, the gate tends to automatically close.

The latch, in addition to being useful for securing the gate in a closed position, is also helpful while the contents are emptying from the hopper. Because the gate is biased toward a closed position due to the moment arm created by the weight of the gate relative to the hinge, the gate will tend to close prior to the entire contents of the hopper being emptied. Therefore, the latch includes a catch or detent which is biased into engagement with a latch pin on the sidewall of the hopper so that after the gate has opened and then begins to close, the catch engages the latch pin to prevent the gate from completely closing. The entire remaining contents of the hopper then has an opportunity to flow from the hopper prior to closure of the gate. After the hopper is emptied, the catch on the latch is disengaged from the latch pin, the gate closes by gravity and the latch is engaged with the latch pin to secure the gate in the closed position for subsequent transport, filling or use.

A release lever is provided to disengage the latch from the latch pin and allow the gate to swing open. Advantageously, each of the release levers for each of the latches are positioned so that a single blow by a mallet, hammer or the like will simultaneously actuate the release levers to disengage the latches and allow the gates to swing open. A presently preferred embodiment of the invention also includes a secondary latch in the form of a chain which can be selectively coupled to a hook on the frame of the hopper to prevent the gate from inadvertently swinging open and discharging the contents of the hopper. Additionally, once the gate is open, the chain can be positioned on the hook to maintain the gate at an intermediate open position and prevent it from completely opening, thereby regulating the flow of the material from the hopper.

The hopper of this invention includes an upper lift ring and lift bar fixed to the frame which can be used by a crane or fork lift to lift and transport the hopper. Additionally, an alternative embodiment of the invention is equipped with a hitch and ground engaging wheels so that the hopper can be conveniently towed behind a vehicle and transported from site to site. Furthermore, the contents of the hopper can be dispersed by towing the hopper behind the vehicle with the gate open.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
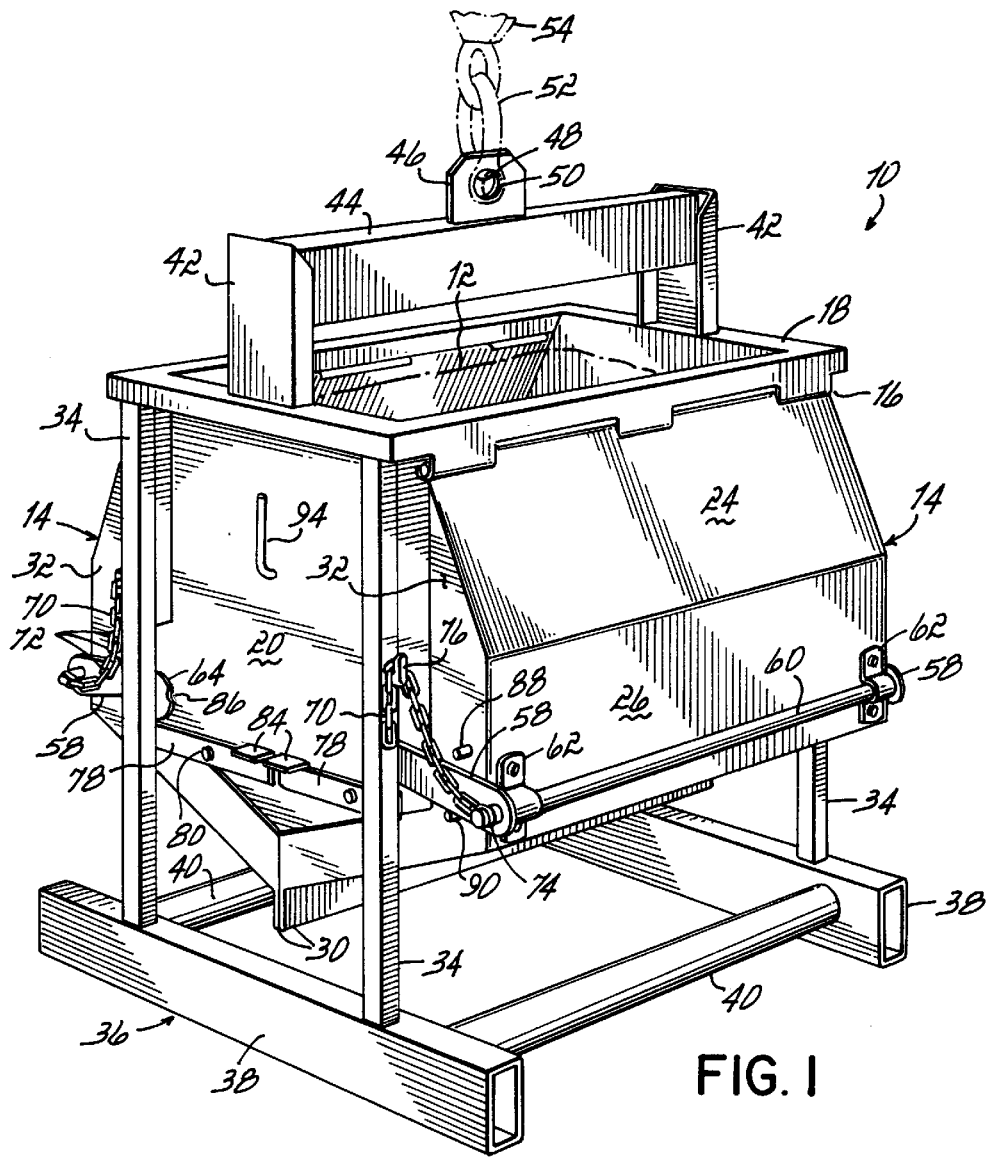
FIG. 1 is a perspective view of a first presently preferred embodiment of a hopper having a pair of opposed gates according to this invention.

Referring to FIGS. 1–4 and, particularly, FIG. 1, a first presently preferred embodiment of a hopper 10 according to this invention is shown. The hopper 10 according to this invention is particularly useful for holding, transporting and discharging flowable materials 12. The term "flowable materials" or variations thereof is used herein and in the appended claims to refer to any material which in response to a gravitational force would flow or empty out of the hopper in an open configuration. Specifically, flowable materials include particulate, aggregate or similar materials including, but not limited to, sand, gravel, rock salt, top soil, mulch, dirt, mortar, rocks, debris and the like including fluids, liquids, slush, snow, ice and other frozen or partly frozen materials. In presently preferred embodiments, the hopper 10 of FIGS. 1–4 has a one cubic yard, 1.5 cubic yard or other volumetric capacity. The dimensions detailed herein are approximate and are for the hopper of FIGS. 1–4 for the purposes of an example applicable to a one cubic yard volumetric capacity. The hopper 10 preferably has about a 4'×4' footprint to maximize the use of truck space or the like during transportation of the hopper 10.

The hopper 10 includes at least one gate 14, two of which are shown in the embodiment of FIGS. 1–4. The gate 14 is pivotally connected along its upper edge by a hinge 16 to an upper, generally rectangular frame 18. Preferably, the frame 18 measures about 31.5"×48" and the frame members are each 2"×2"×3/16" tubular steel. The hinge 16 is reinforced to accommodate the weight and operation of the gate 14. The hopper 10 includes a pair of spaced hopper sidewalls 20, each of which are preferably 10 gauge steel and are positioned between the gates 14 to extend downwardly from the upper frame 18. Preferably, each sidewall 20 is 10 gauge steel and has a central rectangular portion measuring 42"× 23.5" and a lower triangular portion having a 42" upper side and a pair of sloped sides converging at a point about 7.75" below a center point of the upper side. The hopper sidewalls 20 also includes an upper trapezoidal shaped portion with a 42" base and a 29" upper edge spaced about 12.5" from the trapezoidal base. A cross bar 22 (FIG. 3), preferably 3"×3"× 5/16" steel angle iron, extends between the hopper sidewalls 20 to provide structural support and rigidity to the hopper 10.

Figure 2:
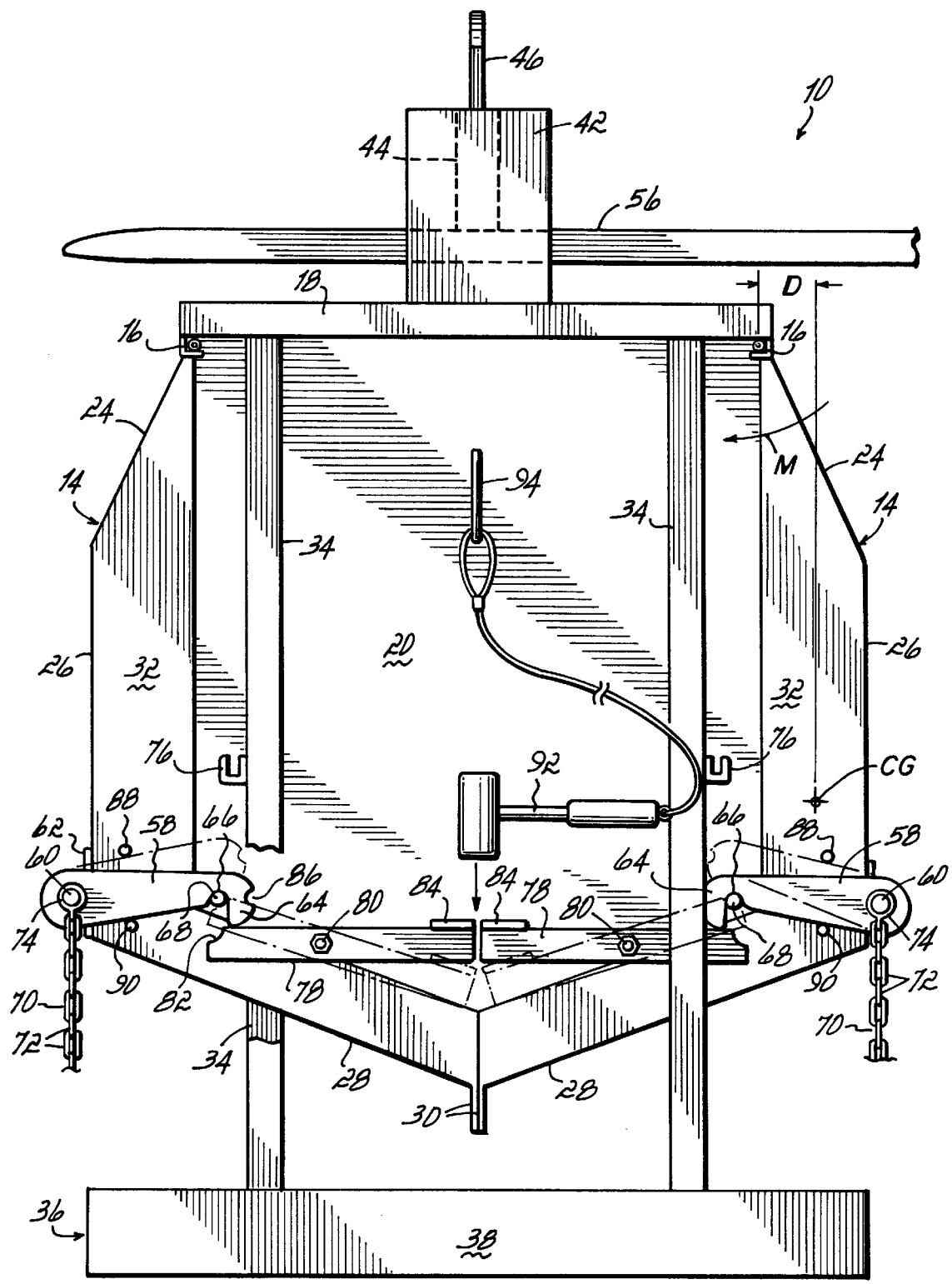
FIG. 2 is a side elevational view of the hopper of FIG. 1 being lifted by the forks of a fork lift and release levers engaging the latches which, as shown in phantom lines, are being disengaged from latch pins to allow the gates to swing to an open position.
Figure 3:
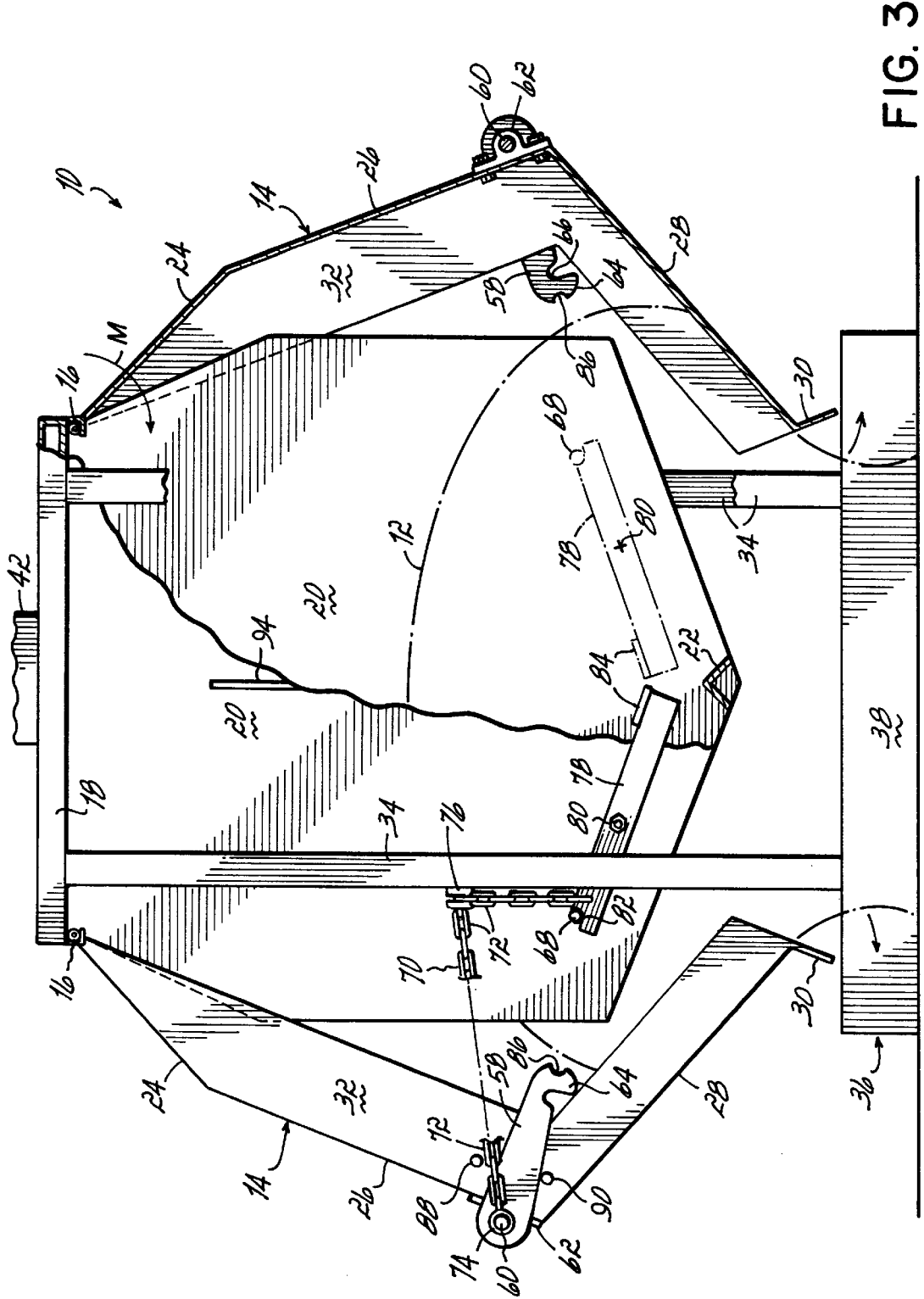
FIG. 3 is a view similar to FIG. 1 with the latch on each gate disengaged and the gates swung toward an open position.

Each gate 14 is pivotal between a closed position for holding the material 12 as shown in FIG. 1 and an open position for discharging the material 12 by gravity as shown in FIG. 3. Each gate 14 in a presently preferred embodiment includes an upper panel 24 sloped approximately 26° with respect to a connected intermediate generally vertical panel 26 when the gate 14 is in the closed position. The intermediate panel 26 is connected to a lower gate panel 28 that is sloped about 70° with respect to the vertical intermediate panel 26. Preferably, each panel 24, 26, 28 is 8 gauge steel with the upper panel 24 measuring 12.665"×40.56"; the intermediate panel 26 measuring 12.157"×40.56" and the lower panel 28 measuring 22.43"×40.56". A terminal edge of the lower gate panel 28 includes a downwardly depending flange 30 which is preferably 2.83"×40.56" and in the embodiment shown in FIGS. 1–4, mates with the flange 30 of the opposite gate 14 when the gates 14 are in the closed position. Each gate 14 includes a pair of spaced gate sidewalls 32 on opposite sides of the gate 14. Each gate sidewall 32 is preferably 8 gauge steel and includes an upper portion which has an edge spaced about 5.53" from the intermediate panel 26 and is parallel thereto and a lower portion with an edge spaced about 5" from the lower panel 28 and is parallel thereto. The gate sidewalls 32 project generally perpendicular to the upper, intermediate and lower gate panels 24, 26, 28.

The upper frame 18 is supported by four posts 34, each of which extend downwardly and are mounted on a base 36 consisting of two spaced beams 38 connected to each other by a pair of spaced struts 40. Preferably, the posts are each 37.75" long and are made out of 2"×2"×3/16" tube steel and the beams are each 48" long and are made out of 3"×3"×3/16" tube steel and the struts are each 2.25" schedule 40 steel pipe. A pair of spaced lift supports 42, preferably each 11" long 7"×2"×3/16" channel iron, extend upwardly from the upper frame and are connected to opposite ends of a lift bar 44, preferably 44" long 2"×6"×3/16" tube steel. The lift bar 44 includes a lift ring 46 mounted on the center of the top edge of the lift bar 44 and extending upwardly. The lift ring 46, preferably 5"×8"×1/4" plate steel, includes a hole 48 through which the pin 50 for a clevis 52 or other structure on a crane 54 or the like can be inserted for lifting the hopper 10. Alternatively, the forks 56 of a fork lift vehicle (not shown) can be inserted beneath the lift bar 44 for lifting the hopper 10 (FIG. 2).

Each gate 14 includes a latch mechanism for selectively securing the gate 14 in a closed position. In a presently preferred embodiment, the latch mechanism includes a pair of spaced L-shaped latches 58 connected by a shaft 60. The latches 58 are preferably about 12.44"×2.35"×3/8" plate steel and the shaft 60 is preferably 1" round steel bar stock. The latches 58 are on opposite sides of the intermediate gate panel 26 proximate the intersection with the lower gate panel 28. The shaft 60 is rotationally mounted to the outer surface of the intermediate gate panel 26 by a pair of spaced collar bearings 62. Each latch 58 is fixedly mounted near an end of the shaft for rotational movement. Each latch 58 includes a downwardly extending leg 64 which helps to define a preferably 0.51" radius elbow recess 66 in the latch 58. The elbow recess 66 is sized and configured to engage a latch pin 68 projecting outwardly from the hopper sidewall 20. The elbow recess 66 of the latch 58 engages the latch pin 68 to thereby secure the gate 14 in the closed position (FIG. 2). Preferably, the latch pin 68 is positioned about 19.31" up from the base of the beams 38 and 17.55" in from the end of the beams 38.

A secondary latch in the form of a chain 70 is also included in a presently preferred embodiment of the hopper 10 to provide a safety backup mechanism for securing the gate 14 in the closed position and prevent the inadvertent discharge of the material 12 or opening of the gate 14. The chain 70 includes a plurality of links 72 and is attached to a ring 74 mounted near the end of the shaft 60. A generally U-shaped hook 76 is mounted on one of the posts 34. To prevent the gate 14 from swinging outwardly toward an open position if the latch 58 is inadvertently released, one of the links 72 is captured in the hook 76 as shown in FIG. 1. Additionally, the chain 70 and hook 76 are used to retain the gate 14 in an intermediate open position during discharge of the material the hopper 10 as will be described hereinbelow.

A release lever 78 is provided to engage the latch 58 and selectively disengage the latch 58 from the latch pin 68 and permit the gate 14 to swing to the open position. The release lever 78 is preferably 14.9"×1.88"×⅜" plate steel and pivotally mounted to the hopper side wall 20 by a pivot pin 80, bolt or the like. A first end of the release lever 78 includes an arcuate notch 82, preferably 0.5" radius, proximate an upper edge of the release lever 78. The upper edge of the release lever 78 near the notch 82 contacts the leg 64 of the L-shaped latch 58 as shown in FIG. 2. A strike plate 84 is mounted on the upper edge of the release lever 78 proximate a second end of the release lever 78 opposite from the notch 82. Preferably, the release lever 78 is pivotally mounted to the hopper sidewall 20 so that the first end of the release lever 78 is biased by gravity upwardly into contact with the latch 58 when the gate 14 is in the closed position. In other words, the pivot pin 80 may not be in the longitudinal center of the release lever 78 or is preferably mounted 7.76" from the first end or notch 82 thereof so that the weight of the lever 78 and the strike plate 84 pivots the second end or strike plate 84 of the lever 78 downwardly and the first end of the lever 78 upwardly as shown by the arrows in FIG. 2. The weight of the strike plate 84 assists in biasing the release lever 78 in this manner.

Figure 4:
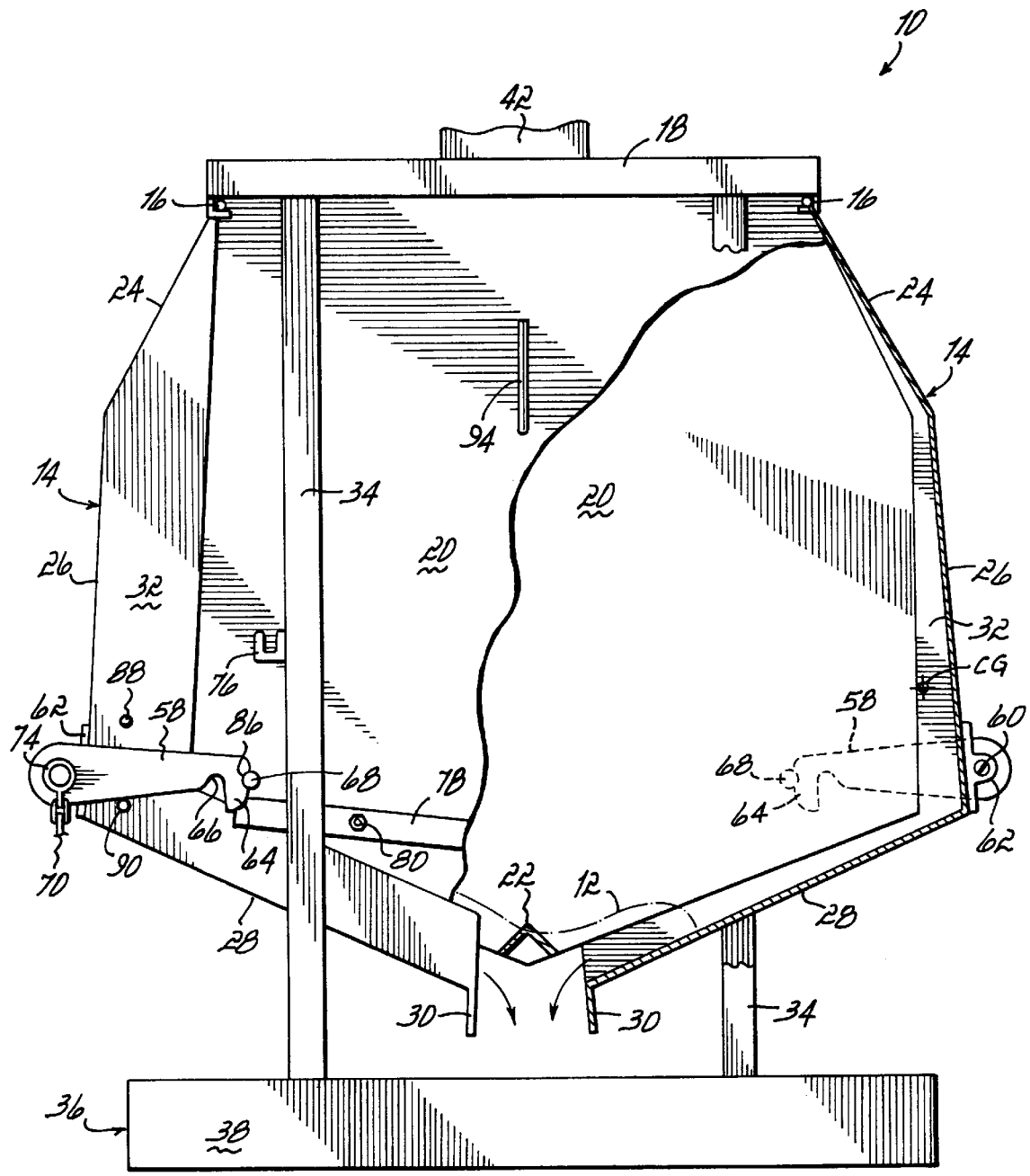
FIG. 4 is a view similar to FIG. 3 with a catch on the latch engaged with the latch pin to prevent complete closure of the gates while the contents of the hopper are completely emptied.

The outer surface of the leg 64 on the L-shaped latch 58 includes an arcuate seat 86 to engage the latch pin 68 when the gate 14 is swinging from the open position toward the closed position (FIG. 4). An upper and a lower stop pin 88, 90 project outwardly from the gate sidewall 32 to limit the upward and downward pivotal movement, respectively, of the latch 58. Preferably, the lower stop pin 90 and upper stop pin 88 are 18.7" and 19.26", respectively, from the centerline of the hopper sidewall 20 and 12.1" and 16.12", respectively, up from the bottom edge of the flange 30. Additionally, a mallet 92 may be tethered to a retainer 94 on the hopper sidewall 20 for use as described hereinbelow.

Figure 1A:
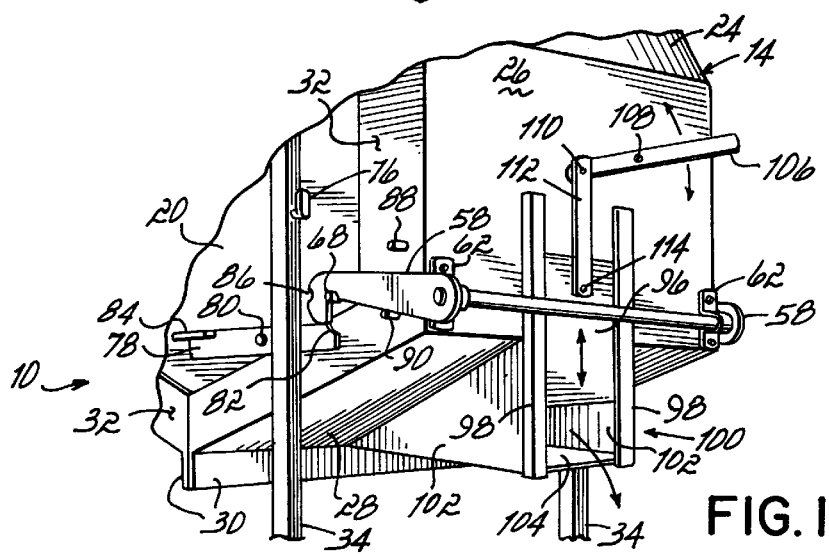
FIG. 1A is an alternative embodiment of one of the gates of the hopper of FIG. 1 with a chute and door.

A hatch 96 is optionally provided on the gate 14 as shown in FIG. 1A. The hatch 96 is preferably 12" wide and mounted between spaced track members 98 for vertical movement along the track members 98 between open and closed configurations. In the closed configuration, the hatch 96 seals off an open end of a chute 100 mounted to the lower gate panel 28. The chute 100 includes a pair of spaced generally triangular-shaped sidewalls 102, preferably having edges measuring 22"×24"×15" and made out of 8 gauge steel, and a rectangular-shaped bottom wall 104, preferably 12"×24" and made out of 8 gauge steel, which cooperate to form the chute 100. An opening (not shown) in the lower gate panel 28 allows the material 12 in the hopper 10 to flow through the lower gate panel 28 and into the chute 100. With the gate 14 in the closed position, an operator pivots a handle 106 upwardly or downwardly to close or open, respectively, the hatch 96. The handle 106 is pivotally mounted by a pin 108 to the intermediate gate panel 26. An end of the handle 106 is pivotally coupled by a pin 110 to a first end of a link 112. Preferably the handle 106 and the link 112 are each ¼" plate steel. An opposite end of the link 112 is pivotally coupled to the hatch 96 by a pin 114. The door 96 can be conveniently used to sample or syphon off a portion of the material 12 in the hopper 10 or regulate the flow of the material 12 without opening the gate 14.

In operation, the hopper 10 according to this invention is loaded or filled with the flowable material 12 through the open upper frame 18 when the gates 14 are in the closed position as shown in FIG. 1. After the material 12 is deposited into the hopper 10, the hopper 10 may be transported to an appropriate job site or the like by lifting the hopper 10 via the lift ring 46 with a crane 54, via the lift bar 44 with forks 56 of a fork lift vehicle or by positioning the forks 56 of a fork lift vehicle under struts 40. Advantageously, one or more filled hoppers 10 can be conveniently positioned on the bed of a tractor trailer, in the bed of a pick-up truck, or on another appropriate vehicle for transport.

After the filled hopper 10 arrives at the job site or other location and the hopper 10 is appropriately transferred to a discharge location as desired, the material 12 in the hopper 10 can be discharged by actuating the release lever 78 and disengaging the latches 58 from the respective latch pins 68. Specifically, the mallet 92 or other appropriate tool can be used to simultaneously or sequentially impact the strike plates 84 on the release levers 78 thereby pivoting the second ends of the release levers 78 downwardly and the first ends of the release levers 78 upwardly. As the first ends of the release levers 78 impact the respective legs of the latches, the latches 58 are disengaged from the respective latch pins 68 as shown in phantom lines in FIG. 2.

After the latch 58 is disengaged from the latch pin 68, the weight of the material 12 in the hopper 10 forces the respective gate 14 to pivot outwardly about the hinge 16 toward the open position. As the gates 14 pivot outwardly, the flanges 30 separate thereby allowing the material 12 in the hopper 10 to flow downwardly by gravity between the gates 14 and out of the hopper 10. The release lever 78 pivots as described until the notch 82 engages the latch pin 68 as show in FIG. 3. After the latch 58 clears the latch pin 68, it pivots downwardly by gravity. The downward movement of the latch 58 is limited by the lower stop pin 90 as shown in FIG. 3. As the material 12 in the hopper 10 flows out of the hopper 10, the weight of the material 12 remaining in the hopper 10 decreases.

As previously described, the weight of the gate 14 creates a moment arm M about the hinge 16 because of the spacing of the center of gravity of the gate 14, and all attached components such as the shaft 60, latch 58, chain 70, etc., relative to the pivot axis of the hinge 16. For illustration purposes, the position of the center of gravity CG of the gate 14 is approximately shown in FIG. 2 as being spaced a distance D relative to a vertical plane containing the pivot axis of the hinge 16 thereby creating the moment arm M which biases the gate 14 toward the closed position. Preferably, the center of gravity CG of the gate is spaced from the pivot axis as described so that even in the closed position the gate 14 continues to be biased by the moment arm M to provide a positive and secure closure even though further pivotal movement of the gate 14 is limited by the opposing gate 14 and the hopper sidewalls 20. Alternatively, the center of gravity CG may be aligned with the pivot axis of the hinge 16 so that when the gate is in any open position it will still be biased by a moment arm M toward the closed position; however, with this position of the center of gravity CG the gate will not be biased when it is in the closed position to provide a tight and secure closure with the opposing gate 14 and the sidewalls 20. Advantageously, the hopper does not require hydraulic, electrical or other mechanisms for opening or closure of the gate 14.

At some point, the force generated by the moment arm M toward the closed position becomes greater than the weight of the material 12 remaining in the hopper 10. Therefore, to allow all of the material 12 to flow from the hopper 10, a catch is provided on the latch 58 to retain the gate 14 at an intermediate open position as shown in FIG. 4. As the gates 14 swing toward the closed position, the seat 86 on in the leg 64 of the latch 58 abuts against the latch pin 68 thereby preventing the complete closure of the gate 14. Preferably, the lower stop pin 90 is positioned to align the seat 86 with the latch pin 68. The catch in the form of the seat 86 thereby allows the remaining material 12 in the hopper 10 to flow between the flanges 30 of the gates 14 which are held in the intermediate position of FIG. 4.

After all of the material 12 has emptied from the hopper 10, each gate 14 is pulled outwardly to disengage the latch pin 68 from the seat 116 and the latches 58 are pivoted upwardly to contact the upper stop pin 88 and allow the leg 58 to clear the latch pin 68 at which time the gate 14 is released and pivots closed as the latch 58 falls downwardly to engage the latch pin 68 in the recess 66 and thereby secure the gate 14 in the closed position. As previously described, a secondary or safety latch is provided by the chain 70 which can then be coupled to the hook 76 after the latch 58 is engaged on the latch pin 68.

An optional mode of operation for the hopper 10 according to this invention is shown in FIG. 3 wherein the chain 70 is coupled to the hook 76 with sufficient slack to permit the release of the latch 58 from the latch pin 68 thereby allowing the gate 14 to swing toward the open position. However, as the gate 14 swings outwardly toward the open position the chain 70 becomes taught thereby preventing further movement of the gate 14 toward the open position. In this manner, the chain 70 is used as a catch to retain the gate 14 at an intermediate open position and inhibit further movement of the gate 14 toward the open position thereby regulating the flow of material 12 from the hopper 10.

It will be readily apparent to one of ordinary skill in the art that use of the chain 70 to limit movement of the gate 14 toward the open position can be used in conjunction with the seat 86 on the latch 58 to prevent the complete closure of the gate as the material flows from the hopper. In other words, the hopper 10 includes two catches to retain the gate 14 at an intermediate open position; namely, the chain 70 and the seat 86.

Moreover, various modes of operation of each of the gates 14 include operation independently or simultaneously with each other as desired by the operator. For example, only one of the gates 14 may be opened, both of the gates 14 opened, one of the gates 14 partially opened, both of the gates 14 partially opened, or one gate 14 partially opened and one gate 14 fully opened. Depending on the volume of the particular flowable material 12 in the hopper 10, it may be necessary to lift the hopper with one or more of the gates 14 in an open position to thereby completely empty the material 12 from the hopper 10.

Figure 5:
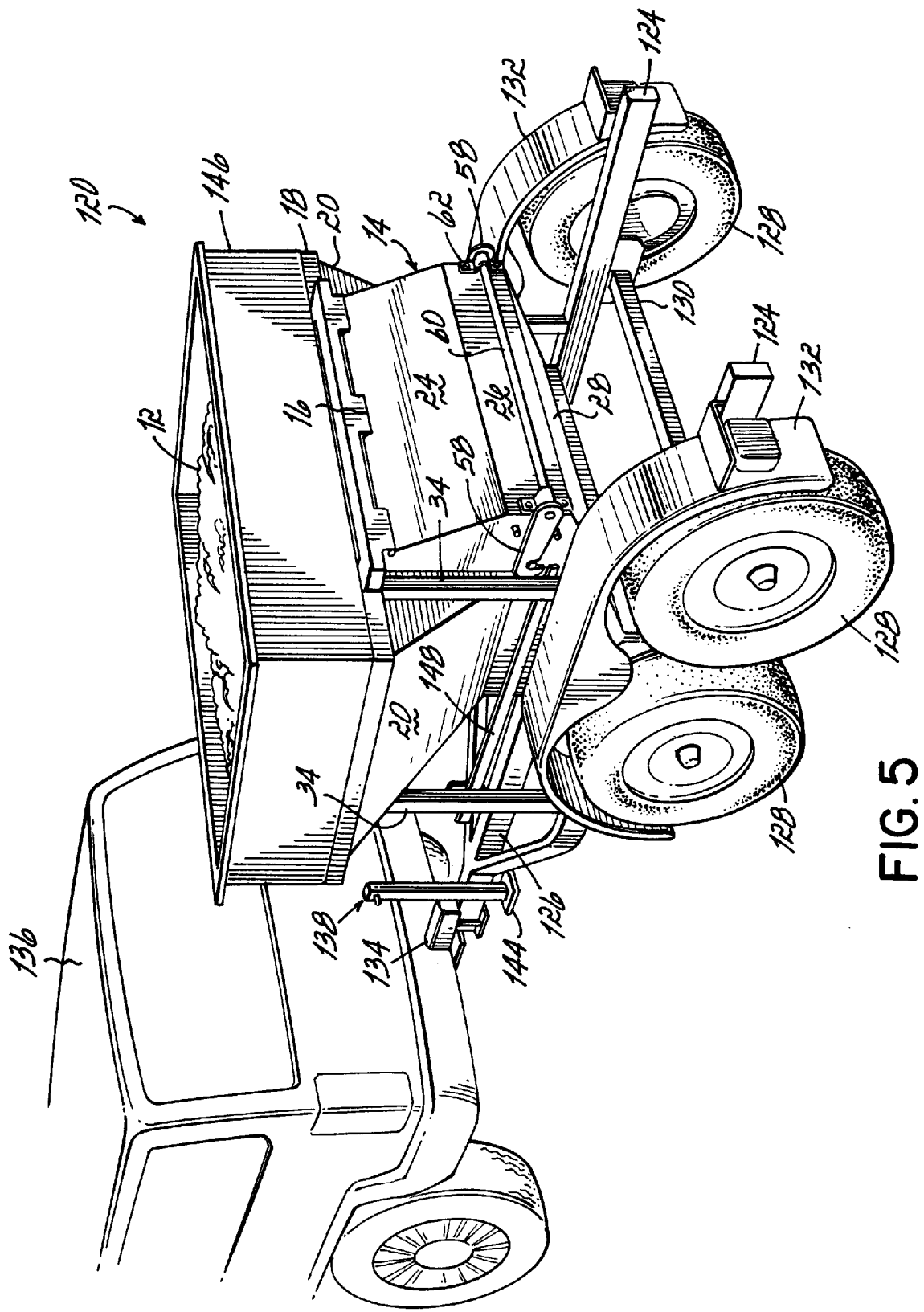
FIG. 5 is a perspective view of a second presently preferred embodiment of a hopper according to this invention.
Figure 6:
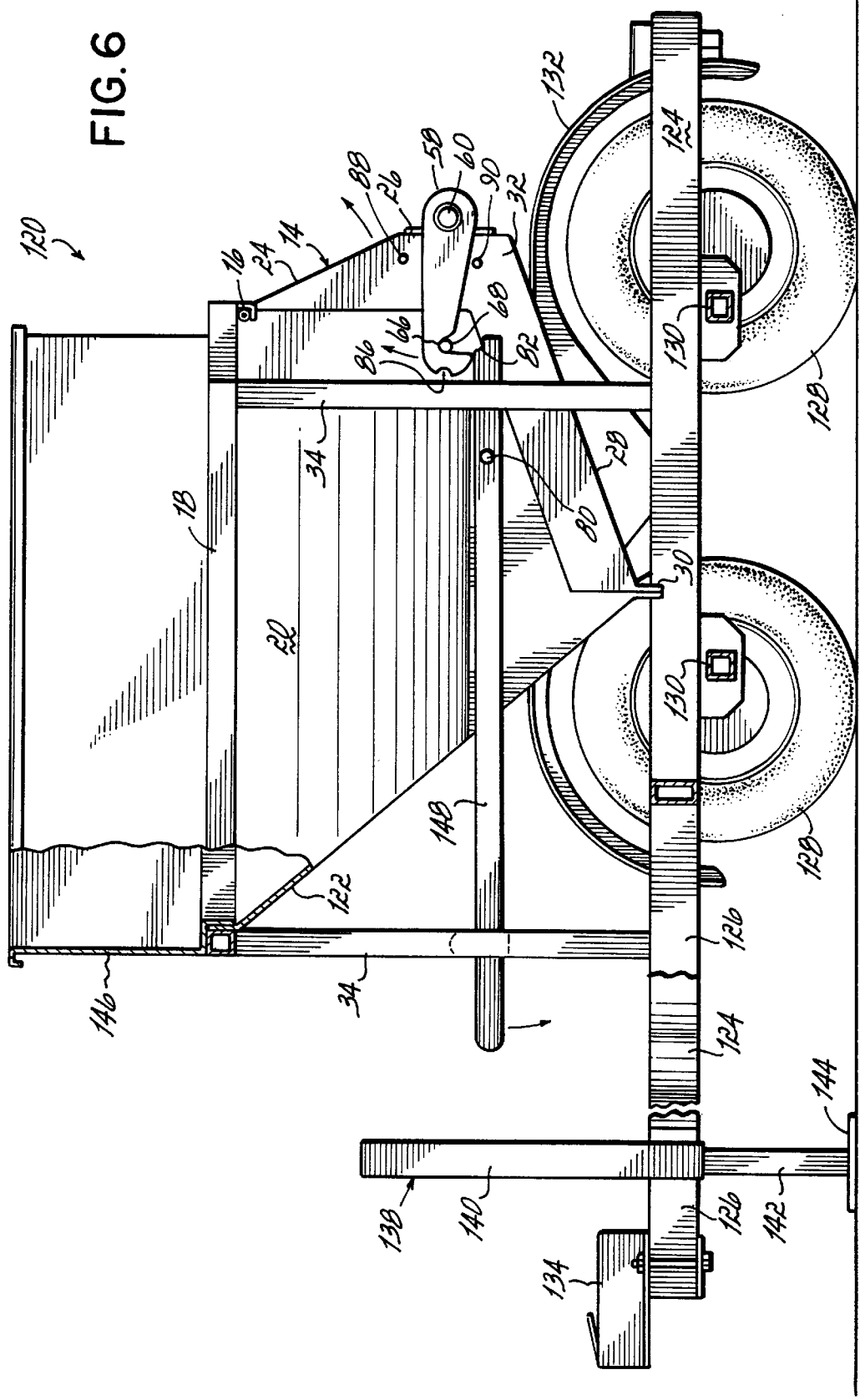
FIG. 6 is a side elevational view in partial cross section of the hopper of FIG. 5.
Figure 7:
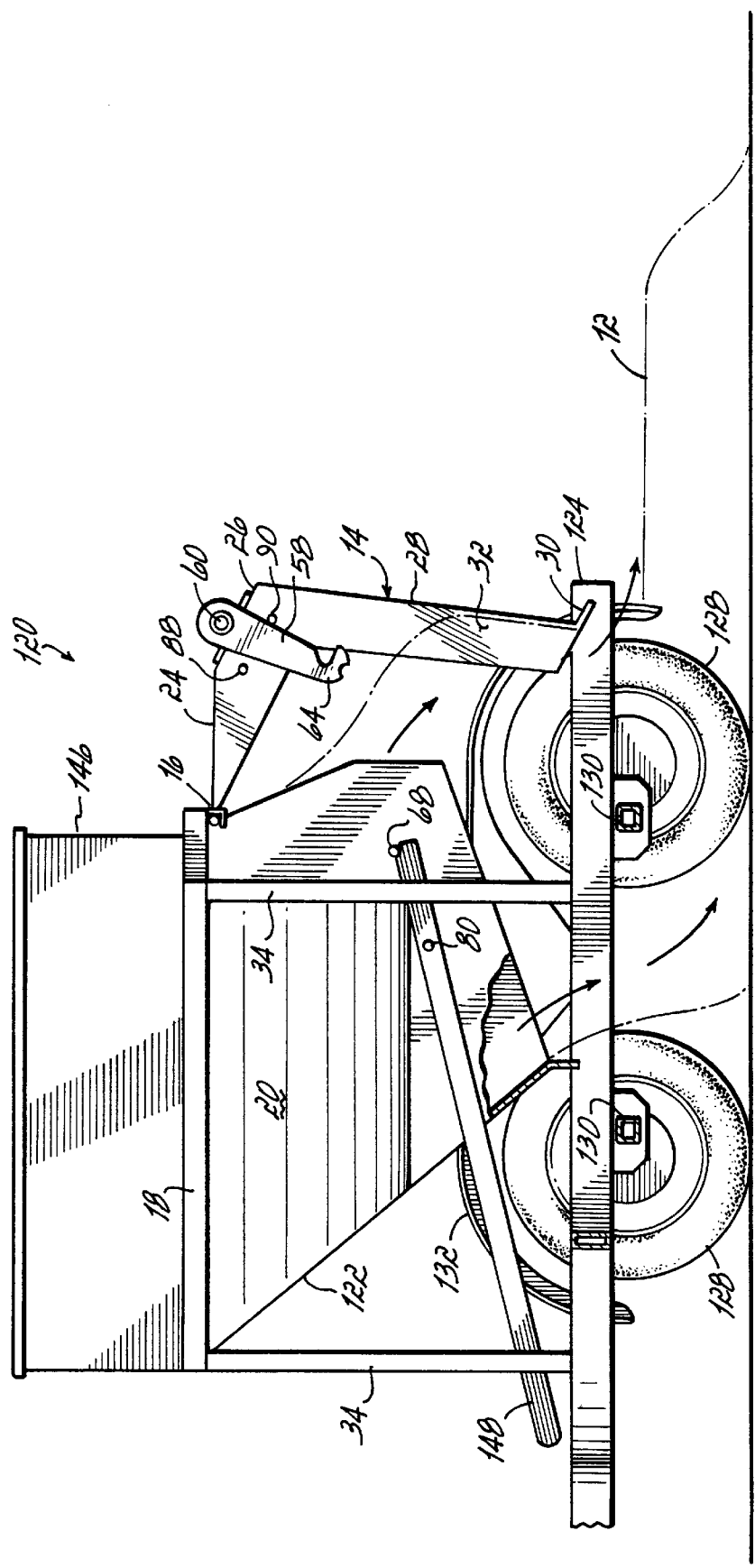
FIG. 7 is a side elevational view in partial cross-section of the hopper of FIG. 5 being towed while discharging the contents of the hopper through the gate in an open position.

A second presently preferred embodiment of hopper 120 according to this invention is shown in FIGS. 5–7 in which components similar to those shown in FIGS. 1–4 are identified with the same reference numerals. The hopper 120 of FIGS. 5–7 preferably includes a single gate 14 having a similar size and configuration to the gate 14 of the hopper 10 of FIGS. 1–4 with the exception of the intermediate panel 26 measuring 8"×40.56". Opposite from the gate 14 in the closed configuration is a sloped hopper end wall 122, preferably 8 gauge steel having an upper trapezoidal shaped portion measuring 64" along a top edge and 40.5" along a parallel bottom edge with a pair of 27.5" long sloped side edges. The hopper end wall 122 also includes a 40.5"×16.5" rectangular lower portion. A pair of spaced hopper side walls 20, each preferably 8 gauge steel having a 42" wide upper edge and a 23" bottom edge, separate the gate 14 from the end wall 122. The gate 14 is pivotally connected to a reinforced hinge 16 mounted onto the upper frame 18 of the hopper 10. The hopper may alternatively be of a two opposing gate construction similar to the device of FIGS. 1–4. The upper frame 18 is connected by posts 34, each preferably 31" long 2"×2"×3/16" tube steel, to a base 36 which includes a pair of outer rails 124, preferably 2"×4"×3/16" tube steel spaced 48" from one another, and an intermediate center rail 126. Ground engaging wheels 128 are mounted for rotation on the outer rails 124 and a support strut 130 extends between the outer rails 124. The wheels 128 are protected by fenders 132.

The outer rails 124 merge together and the center rail 126 extends toward a hitch 134 so that the hopper 120 can be coupled to a vehicle 136 for towing. An adjustable support 138 is also mounted to the rail 126 near the hitch 134 to maintain the hopper 120 in a generally horizontal attitude when the hitch 134 is not connected to the vehicle 136. The adjustable support 138 includes an outer tubular housing 140 mounted to the center rail 126 and a mast 142 telescopingly fitted within the housing 140 to be selectively extended (FIG. 6) or retracted (FIG. 5). A ground engaging footing 144 is fixed on a lower end of the mast 142.

An optional rectangular riser 146 may be attached to extend upwardly from the upper frame 18 to increase the capacity of the hopper 120. In one presently preferred embodiment, the riser 146 is 13.8"×48"×68" and made out of 8 gauge steel with a top reinforcing frame. The riser 146 increases the capacity of the hopper 120 from one cubic yard to two cubic yards.

A release lever 148 of the hopper 120 in FIGS. 5–7 is pivotally mounted to one of the hopper sidewalls 20 and the second end of the release lever extends toward the hitch 134 and beyond of the posts 34 as shown in FIG. 6. The release lever 148 is preferably 53.25"×2"×¼" plate steel and pivotally attached with pin 80 about 7" from the first end proximate latch pin 68. Advantageously, an operator forces the second end of the release lever 148 downwardly thereby dislodging the latch 58 from the latch pin 68 and allowing the gate 14 to swing outwardly toward an open position. As with the other embodiments, the center of gravity CG of the gate 14 is spaced from the hinge to create a moment arm M which biases the gate 14 into the closed position. The operation of the catch, latch, safety chain and other features of the hopper 120 of FIGS. 5–7 is similar to that as described with respect to the hopper of FIGS. 1–4.

Additionally, the second presently preferred embodiment of the hopper 120 can advantageously be used while being towed to discharge the material 12 as the hopper 120 is moving forwardly thereby dispersing or spreading the material 12 along the ground as shown in FIG. 7. Alternatively, although not shown in FIGS. 5–7, a lift bar, lift ring, chute and door may be incorporated into the second presently preferred embodiment of the invention.

From the above disclosure of the general principles of the present invention and the preceding detailed description of a preferred embodiment, those skilled in the art will readily comprehend the various modifications to which this invention is susceptible. Therefore, we desire to be limited only by the scope of the following claims and equivalents thereof.

What is claimed is:

1. A hopper for holding and discharging flowable material, the hopper comprising:

an upper frame supported by a base;

a hopper wall;

at least one gate having a center of gravity and being pivotally suspended from the upper frame at a location for movement to and between a closed position for holding the material and an open position for discharging the material by gravity, wherein the center of gravity of the gate is spaced from the location to create a moment arm about the location which biases the gate toward the closed position;

a latch mounted on the hopper to selectively secure the gate in the closed position;

a release lever mounted on the hopper and biased toward engagement with the latch to thereby release the latch, wherein the release of the latch permits the material to flow downwardly by gravity from the hopper and forces the gate toward the open position; and a catch to retain the gate at an intermediate open position and inhibit movement of the gate to allow the material to flow from the hopper.

2. The hopper of claim 1 further comprising:

a pair of spaced sidewalls, one of which is the hopper wall;

a second gate being similar to and opposing the gate, the second gate and the gate being positioned between the spaced sidewalls, each gate having a lower edge contacting the other gate when the gates are in the closed position.

3. The hopper of claim 2 wherein each of the gates can be selectively opened and closed independently of the other and in conjunction with the other.

4. The hopper of claim 1 wherein the latch is pivotally mounted on the gate for engagement with a latch pin projecting from the hopper wall to secure the gate in the closed position.

5. The hopper of claim 4 wherein the release lever is pivotally mounted on the hopper wall so that a first end of the release lever is biased by gravity upwardly into contact with the latch when the gate is in the closed position.

6. The hopper of claim 5 further comprising:

a strike plate on a second end of the release lever opposite the first end, wherein a downward force on the strike plate rotates the release lever so that the first end disengages the latch from the latch pin and the material forces the gate toward the open position and flows from the hopper.

7. The hopper of claim 1 further comprising:

a secondary latch which is not engageable by the release lever and selectively secures the gate in the closed position.

8. The hopper of claim 7 wherein the secondary latch comprises the catch and is selectively engageable at a plurality of positions to limit the movement of the gate toward the open position and regulate the flow of the material from the hopper.

9. The hopper of claim 7 wherein the catch comprises a seat on the latch which engages a latch pin when the gate is moving toward the closed position to inhibit further movement of the gate and retain the gate at the intermediate position, the secondary latch being selectively engageable at a plurality of positions to limit the movement of the gate toward the open position and regulate the flow of the material from the hopper.

10. The hopper of claim 1 further comprising:

upper and lower detents to limit the movement of the latch in upward and downward directions, respectively.

11. The hopper of claim 1 further comprising:

a door mounted on the gate for movement between open and closed configurations when the gate is in the closed position, the door permitting the selective discharge of at least some of the material from the hopper.

12. The hopper of claim 1 further comprising:

ground engaging wheels mounted to the base for rotation; and a hitch for coupling to a vehicle for towing the hopper, wherein the hopper is towed along the ground by the vehicle when the gate is in the open position to discharge the material during the towing.

13. The hopper of claim 1 further comprising:

an extension riser selectively mounted on the upper frame to increase the capacity of the hopper.

14. A hopper for holding and discharging flowable material, the hopper comprising:

an upper frame supported by a base;

a pair of spaced sidewalls;

a pair of opposed gates, each gate being positioned between the spaced sidewalls, having a center of gravity and being pivotally suspended from the upper frame at a hinge for movement to and between a closed position for holding the material and an open position for discharging the material by gravity, wherein the center of gravity of each gate is spaced from the associated hinge to create a moment arm about the hinge which biases the gate toward the closed position;

a latch for each gate mounted on one of the sidewalls to selectively secure the gate in the closed position;

a release lever associated with each latch and being pivotally mounted on one of the sidewalls, the release lever being biased toward engagement with the latch to thereby release the latch, wherein the release of the latch permits the material to flow downwardly by gravity from the hopper and forces the gate toward the open position;

a catch on the latch to retain the gate at an intermediate open position and inhibit movement of the gate toward the closed position to allow the material to flow from the hopper; and a secondary latch which is not engageable by the release lever and selectively secures the gate in the closed position, the secondary latch further being selectively engageable at a plurality of positions to limit the movement of the gate toward the open position to regulate the flow of the material from the hopper.

15. The hopper of claim 14 further comprising:

a door mounted on each gate for movement between open and closed configurations when the gate is in the closed position, the door permitting the selective discharge of at least some of the material from the hopper.

16. The hopper of claim 14 further comprising:

ground engaging wheels mounted to the base for rotation; and a hitch for coupling to a vehicle for towing the hopper, wherein the hopper is towed along the ground by the vehicle when each gate is in the open position to discharge the material during the towing.

17. The hopper of claim 14 further comprising:

an extension riser selectively mounted on the frame to increase the capacity of the hopper.

18. A hopper comprising:

a frame having an upper frame section and a base, the upper frame section being connected to the base by four posts;

a pair of spaced, fixed sides depending downwardly from the upper frame;

a pair of movable opposing gates positioned between the spaced, fixed sides, each gate being pivotally connected with a hinge to the upper frame section at an upper edge of the gate to permit the gate to pivot about the hinge to and between a closed position and an open position, a lower edge of each gate contacting the lower edge of the opposing gate when each of the gates are in the closed position, a center of gravity of each gate being vertically spaced from the hinge to create a moment arm about the hinge which forces the gate toward the closed position;

a latch pivotally mounted on each side edge of each gate, each latch having a hook formed on an inner end thereof, the hook mating with a latch pin projecting from the associated side of the hopper when the gate is in the closed position and the latch is in a down position, each latch being biased by gravity toward the down position and pivotal movement of the latch being limited by a lower stop pin and an upper stop pin on the gate to prevent rotation of the latch beyond the down position and an up position, respectively, the latch having a recess on an outer edge of the hook;

a release lever pivotally mounted to one of the sides for each latch, each release lever having a strike plate on an upper edge of an inner end of the release lever, an upper edge of the outer end of the release lever contacting the hook on the latch such that downward force on the strike plate when the gate is latched in the closed position will pivot the outer end of the release lever upwardly to contact the hook and disengage the hook from the latch pin;

wherein when the release lever strike plate is forced downwardly the latch hook is disengaged from the latch pin and the gate pivots outwardly toward the open position in response to the weight of the contents of the hopper, the latch pivoting downwardly toward the lower stop pin so that the recess on the hook contacts the latch pin and prevents the gate from closing until all of the contents of the hopper are emptied therefrom;

a chain connected to each of the latches at a first end; and a chain catch on each of the posts to receive therein the chain and provide a safety for the gate in the closed position and prevent the gate from opening even if the hook on the latch is disengaged from the latch pin;

wherein pulling on the chain when the gate is held open by the recess on the hook and the latch pin will disengage the recess from the latch pin and allow the latch to pivot first upwardly and then downwardly until the hook mates with the latch pin and the gate returns to the closed position by gravity.

19. The hopper of claim 18 further comprising:

a door mounted on each gate for movement between open and closed configurations when the gate is in the closed position, the door permitting the selective discharge of at least some of the material from the hopper.

20. The hopper of claim 18 further comprising:

ground engaging wheels mounted to the base for rotation; and a hitch for coupling to a vehicle for towing the hopper, wherein the hopper is towed along the ground by the vehicle when each gate is in the open position to discharge the material during the towing.

21. The hopper of claim 18 further comprising:

an extension riser selectively mounted on the frame to increase the capacity of the hopper.

* * * * *